(12) United States Patent
Chen et al.

(10) Patent No.: US 12,174,995 B2
(45) Date of Patent: Dec. 24, 2024

(54) METHOD AND APPARATUS FOR REMOVING PRIVACY SENSITIVE OBJECTS IN AN AUGMENTED REALITY SYSTEM

(71) Applicant: Samsung Electronics Co., Ltd., Suwon-si (KR)

(72) Inventors: Winston Chen, Melrose, MA (US); Laszlo Gombos, Winchester, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 17/658,968

(22) Filed: Apr. 12, 2022

(65) Prior Publication Data

US 2022/0374543 A1    Nov. 24, 2022

Related U.S. Application Data

(60) Provisional application No. 63/192,387, filed on May 24, 2021.

(51) Int. Cl.
*G06F 21/62*    (2013.01)
*G06T 11/60*    (2006.01)
*G06T 19/00*    (2011.01)
*H04N 13/30*    (2018.01)

(52) U.S. Cl.
CPC .......... *G06F 21/6245* (2013.01); *G06T 11/60* (2013.01); *G06T 19/006* (2013.01); *H04N 13/30* (2018.05); *H04N 2013/403* (2018.05)

(58) Field of Classification Search
CPC ... G06F 21/6245; G06T 11/60; G06T 19/006; H04N 13/30; H04N 2013/403
See application file for complete search history.

(56) References Cited

U.S. PATENT DOCUMENTS

| | | | |
|---|---|---|---|
| 8,666,110 B2 | 3/2014 | Yoo et al. | |
| 10,108,306 B2 | 10/2018 | Khoo et al. | |
| 10,242,282 B2 | 3/2019 | Loce et al. | |
| 11,372,655 B2* | 6/2022 | Garstenauer | G06F 9/451 |
| 2019/0011703 A1* | 1/2019 | Robaina | G02B 27/01 |
| 2020/0004984 A1* | 1/2020 | Lee | G06N 20/00 |
| 2021/0151058 A1* | 5/2021 | Cheung | G10L 17/00 |
| 2022/0318035 A1 | 10/2022 | Garstenauer et al. | |

FOREIGN PATENT DOCUMENTS

KR    101626546 B1    6/2016

OTHER PUBLICATIONS

Redmon, et al., "You Only Look Once: Unified, Real-Time Object Detection", http://pjreddie.com/yolo/, 10 pgs.

* cited by examiner

*Primary Examiner* — Kristie D Shingles

(57) ABSTRACT

A method includes receiving, at an intermediary layer, from a camera of a head mounted display (HMD), image data of a real-world operating environment of the HMD at a first time. The method further includes identifying, at the intermediary layer, one or more objects in the image data, determining, at the intermediary layer, coordinates of a region comprising the one or more identified objects, determining a display permission for the one or more identified objects, modifying the image data in the region comprising the one or more identified objects according to the display permission and outputting the modified image data to an application executing outside of the intermediary layer.

20 Claims, 10 Drawing Sheets

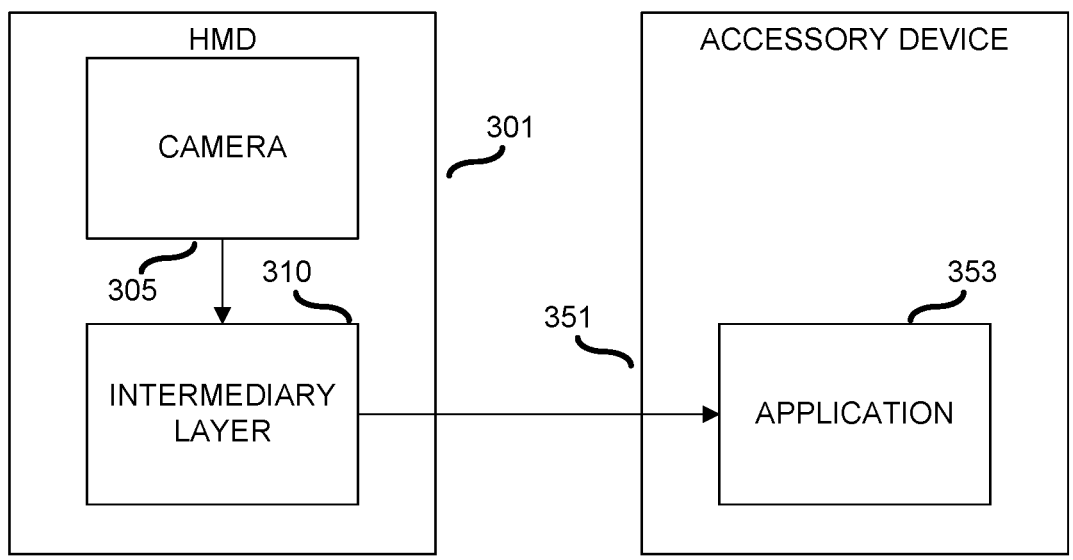
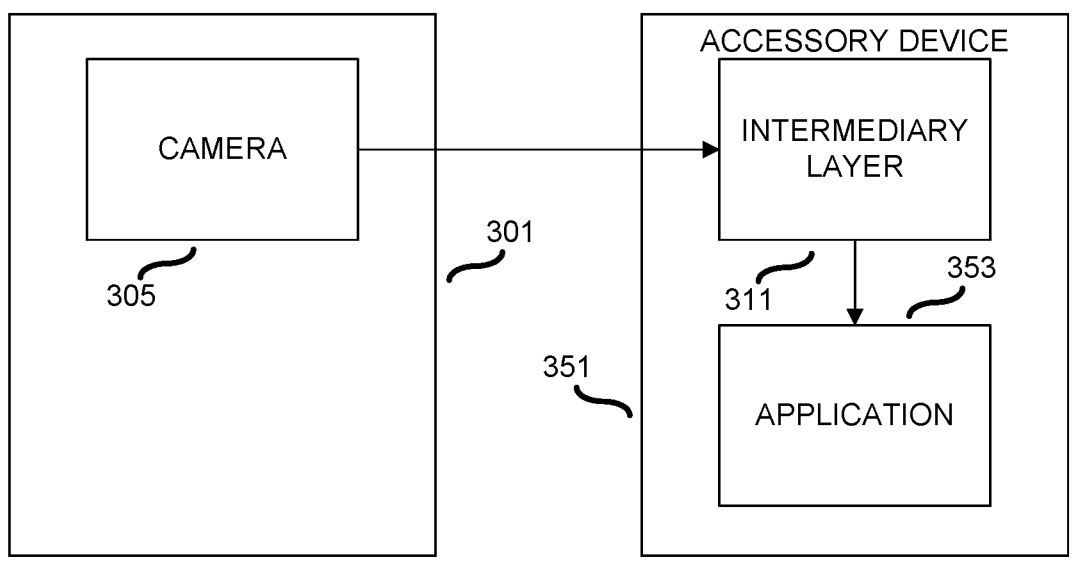

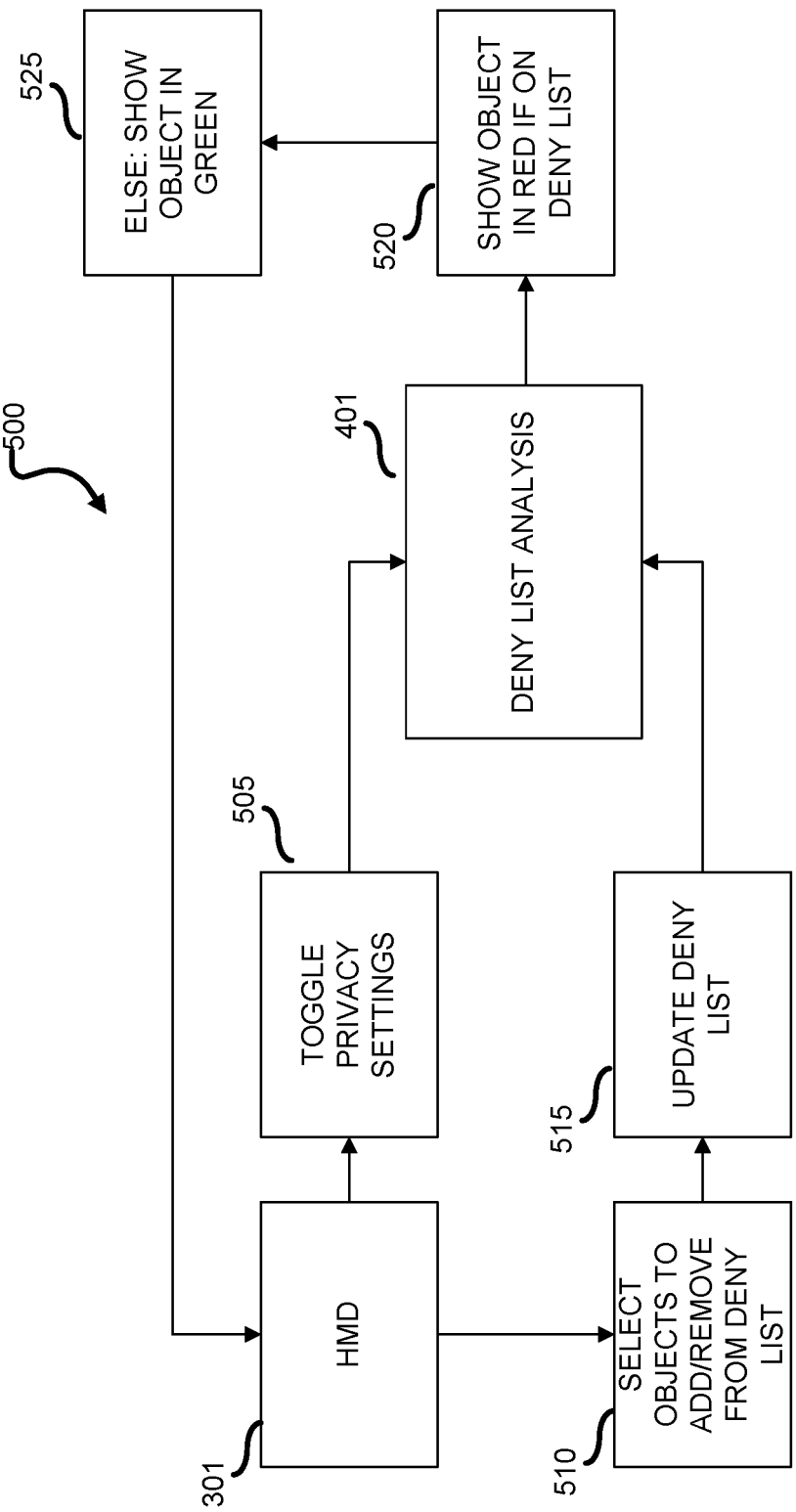

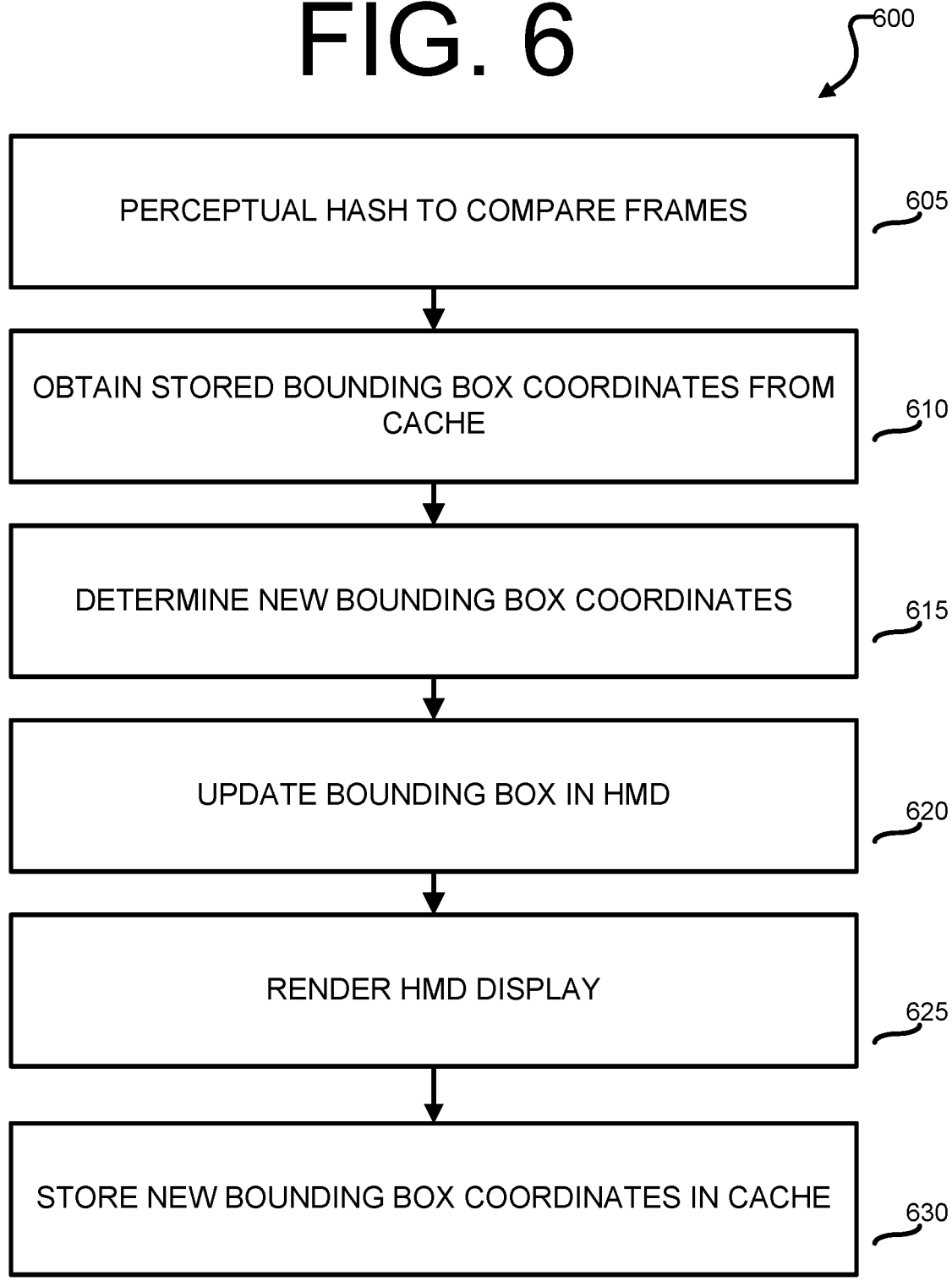

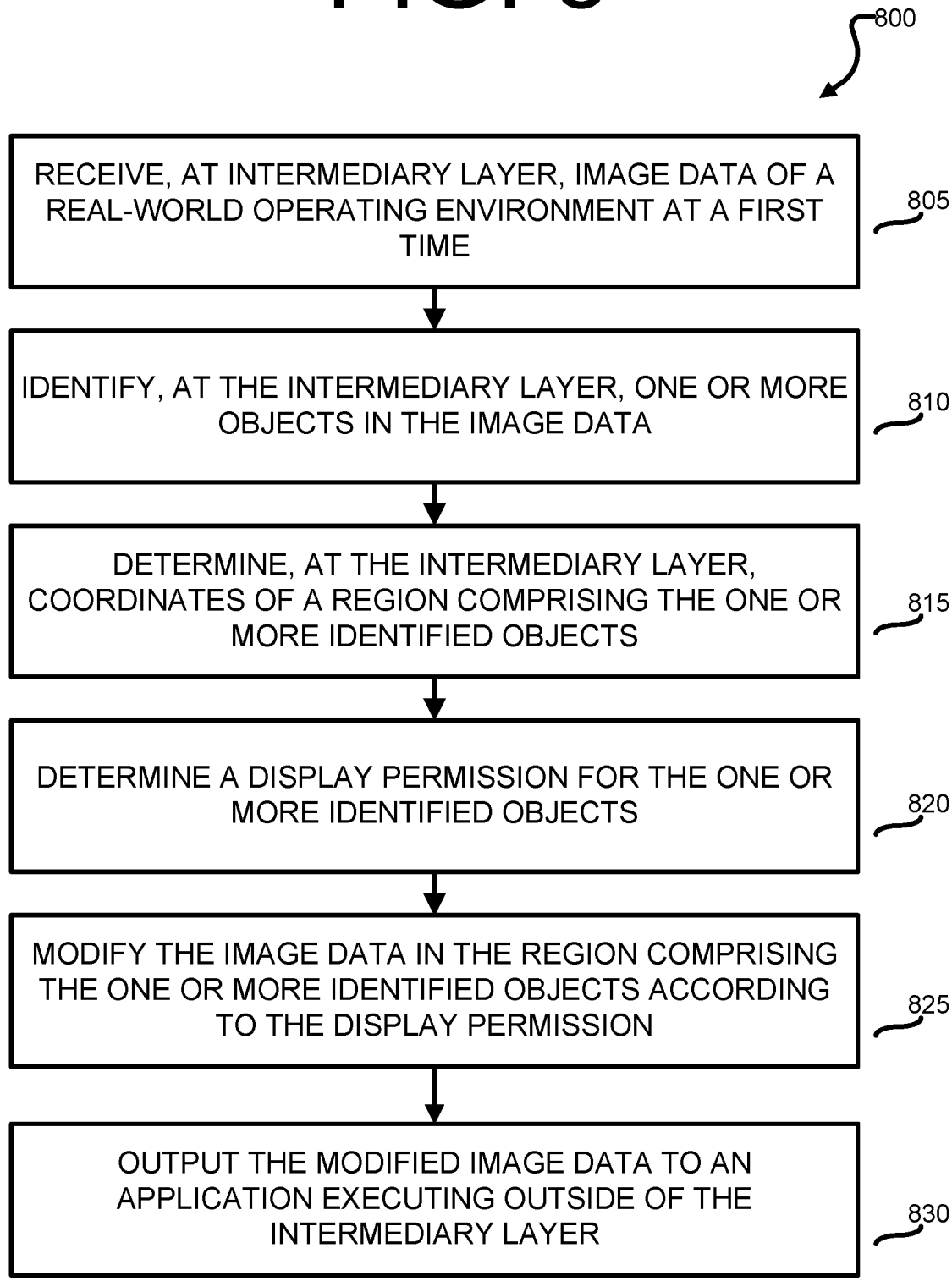

METHOD AND APPARATUS FOR REMOVING PRIVACY SENSITIVE OBJECTS IN AN AUGMENTED REALITY SYSTEM

CROSS-REFERENCE TO RELATED APPLICATION AND CLAIM OF PRIORITY

This application claims priority under 35 U.S.C. § 119(e) to U.S. Provisional Patent Application No. 63/192,387 filed on May 24, 2021. The above-identified provisional patent application is hereby incorporated by reference in its entirety.

TECHNICAL FIELD

This disclosure relates generally to augmented reality (AR) and systems and methods for securing and controlling the propagation of privacy sensitive data captured by sensors supporting AR displays. More specifically, this disclosure relates to a method and apparatus for removing privacy sensitive objects in an augmented reality system.

BACKGROUND

Digital privacy and digital stewardship of privacy-sensitive data, such as digital images of individuals' faces, vehicle license plates, and their home environments, has become an area of increasing technological and regulatory concern. For example, certain jurisdictions, such as the European Union and the state of California have enacted digital privacy statutes, which regulate the collection and digital dissemination of individuals' privacy sensitive data and provide for significant legal penalties for breach.

Augmented reality (AR) and other devices which provide a display which combines elements of a real-world view with digital content associated with and/or superimposed on the real-world view typically rely on a continuous, or near-continuous feed of data from one or more visual sensors (for example, digital cameras or dynamic vision sensors) on a wearer's operating environment. Accordingly, the continuous feed of visual data ingested by AR devices may contain a large quantity of ambient privacy-sensitive data, such as the location of a car with a particular license plate. In contrast to humans, for whom such potentially privacy-sensitive information is naturally forgotten, or at most, only briefly retained as short-term memories, digital platforms, by their nature, can potentially capture and communicate ambient privacy-sensitive data.

Further, once data is transferred from a capturing device (i.e., a smartphone or HMD) to one or more other computing platforms, via a publicly accessible network (for example, the internet), the ability of individuals with legitimate privacy interests in the privacy-sensitive data to exercise control over the data is significantly diminished, if not reduced.

Accordingly, providing effective controls for restricting the dissemination of ambient privacy-sensitive data captured through the normal operation of cameras and video sensors supporting AR displays remains a source of technical challenges and opportunities for improvement in the art.

SUMMARY

This disclosure provides a system and method for implementing an intermediary layer for removing image data of privacy sensitive objects in an AR system.

In a first embodiment, a method includes receiving, at an intermediary layer, from a camera of a head mounted display (HMD), image data of a real-world operating environment of the HMD at a first time. The method further includes identifying, at the intermediary layer, one or more objects in the image data, determining, at the intermediary layer, coordinates of a region comprising the one or more identified objects, determining a display permission for the one or more identified objects, modifying the image data in the region comprising the one or more identified objects according to the display permission and outputting the modified image data to an application executing outside of the intermediary layer.

In a second embodiment, an apparatus includes a processor and a memory. The memory contains instructions, which, when implemented by the processor, cause the apparatus to receive, at an intermediary layer, from a camera of a head mounted display (HMD), image data of a real-world operating environment of the HMD at a first time, identify, at the intermediary layer, one or more objects in the image data, determine, at the intermediary layer, coordinates of a region comprising the one or more identified objects, determine a display permission for the one or more identified objects, modify the image data in the region comprising the one or more identified objects according to the display permission, and output the modified image data to an application executing outside of the intermediary layer.

In a third embodiment, a non-transitory, computer-readable medium contains instructions, which, when executed by a processor, cause an apparatus to receive, at an intermediary layer, from a camera of a head mounted display (HMD), image data of a real-world operating environment of the HMD at a first time, identify, at the intermediary layer, one or more objects in the image data, determine, at the intermediary layer, coordinates of a region comprising the one or more identified objects, determine a display permission for the one or more identified objects, modify the image data in the region comprising the one or more identified objects according to the display permission, and output the modified image data to an application executing outside of the intermediary layer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory, random access memory, a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 3A and 3B illustrate examples of AR system architectures for implementing an intermediary layer, according to some embodiments of this disclosure;

FIG. 5 illustrates an example architecture for user definition of a deny list and/or privacy setting, according to some embodiments of this disclosure;

FIG. 6 illustrates a process for repurposing cached object detection and data modification, according to certain embodiments of this disclosure;

FIG. 8 illustrates a process for implementing privacy controls at an intermediary layer according to certain embodiments of this disclosure.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
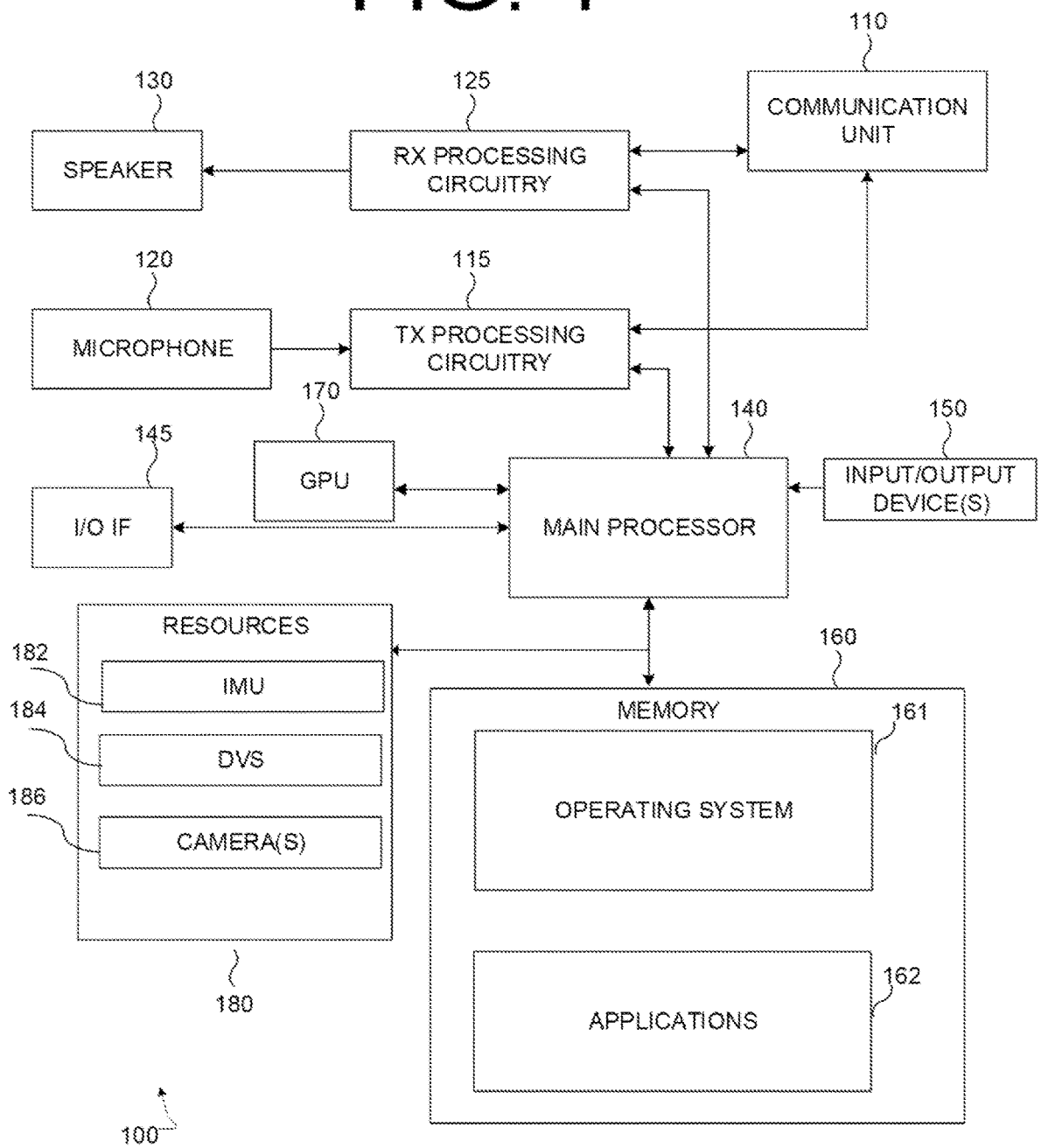
FIG. 1 illustrates an example of an electronic device for implementing systems and methods for augmented reality according to certain embodiments of this disclosure.

FIG. 1 illustrates a non-limiting example of a device 100 for removing privacy sensitive objects in an augmented reality system according to some embodiments of this disclosure. The embodiment of the device 100 shown in FIG. 1 is for illustration only, and other configurations are possible. However, suitable devices come in a wide variety of configurations, and FIG. 1 does not limit the scope of this disclosure to any particular implementation of a device. For example, device 100 may be implemented as an HMD, or as a separate device (for example, a smartphone) controlling an AR display presented at a connected (for example, through a BLUETOOTH or ZIGBEE connection) HMD. Depending on the form factor, battery life, and other performance requirements of the system providing the AR display, other embodiments are possible and within the contemplated scope of this disclosure.

As shown in the non-limiting example of FIG. 1, the device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume image data from physical objects in a field of view of a camera of electronic device 100 and provide AR or VR content through a display of device 100, or a display of a separate device. Further, one or more of applications 162 are configured provide a view of a user's operating environment in which AR content is presented in conjunction with objects, including potentially privacy-sensitive objects, captured by a camera.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, head mounted displays (HMD), touch screens, mouse(s), track balls or other devices capable of acting as a user interface to allow a user to interact with electronic device 100. In some embodiments, input/output device(s) 150 can include a touch panel, a (digital) pen sensor, a key, or an ultrasonic input device.

Input/output device(s) 150 can include one or more screens, which can be a liquid crystal display, light-emitting diode (LED) display, an optical LED (OLED), an active-matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a dynamic vision sensor (DVS) 184, one or more cameras 186 of electronic device 100, which provide a feed of image data of an operating environment to support an AR display.

Although FIG. 1 illustrates one example of a device 100 for removing privacy-sensitive objects from an AR display, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
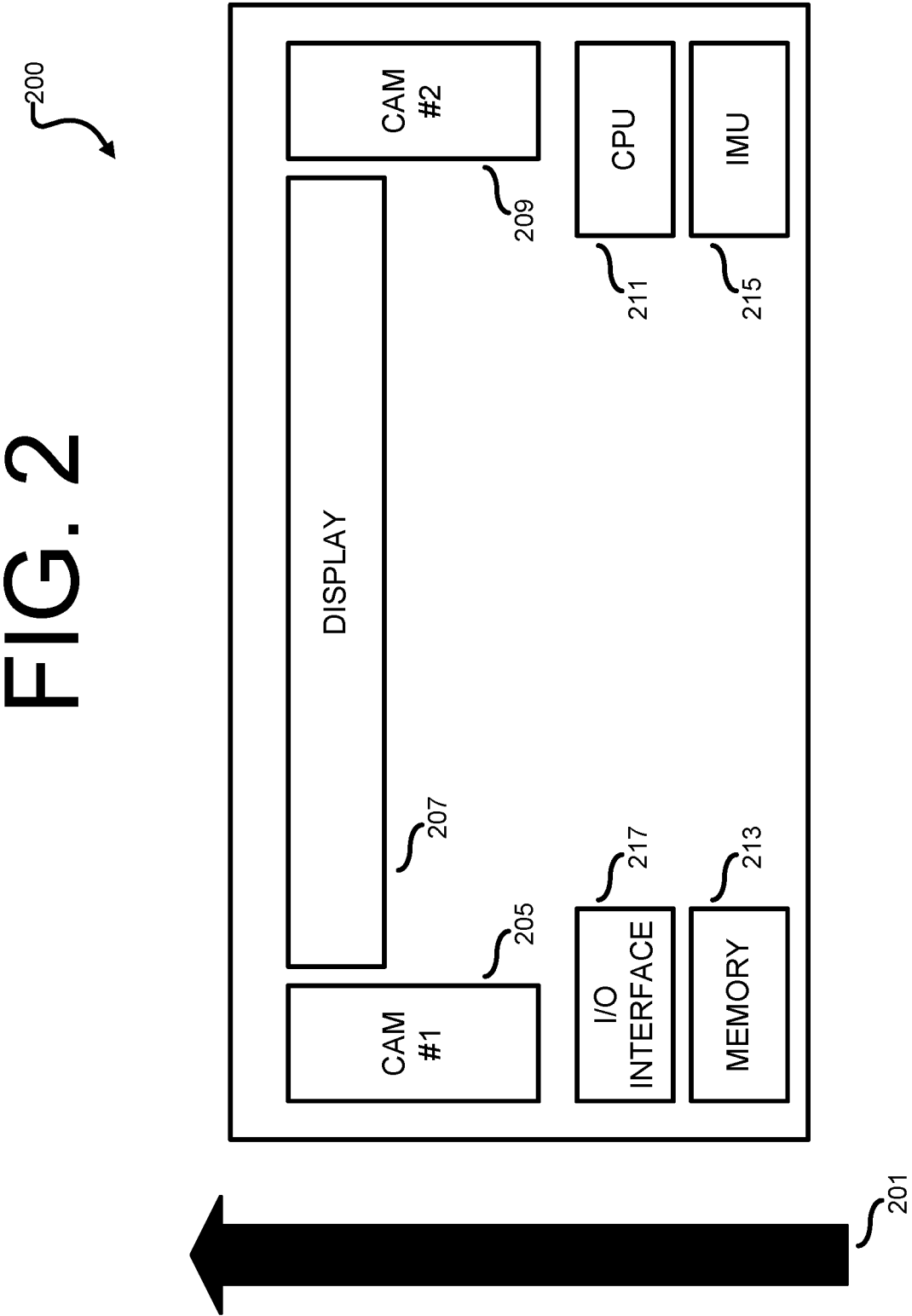
FIG. 2 illustrates an example of a head mounted display according to certain embodiments of this disclosure.

FIG. 2 illustrates an example of an HMD 200 according to one or more embodiments of this disclosure. The embodiment of the HMD 200 shown in FIG. 2 is for illustration only. Other embodiments of HMD 200 could be used without departing from the scope of this disclosure. According to some embodiments, HMD 200 may operate as an accessory device to another device (for example, a smartphone).

Referring to the non-limiting example of FIG. 2, HMD 200 includes an externally oriented camera 205, which captures image data of a real-world operating environment of the HMD. According to certain embodiments, externally-oriented camera 205 is positioned at a location proximate to the wearer's eyes, to minimize parallax differences between the natural perspective of a scene from the wearer's eyes, and the perspective of the scene as recorded by externally-oriented camera 205. For the purposes of explaining this non-limiting example, the arrow 201 is provided. Arrow 201 points externally, towards a field of view away from the direction of projection of an internal-facing display of HMD 200. According to various embodiments, externally oriented camera 205 is an RGB digital video camera (for example, a camera using a CMOS sensor). According to some embodiments, externally oriented camera 205 is a camera capable of detecting light at wavelengths outside the visible range of the human eye (for example, infrared). In certain embodiments, externally oriented camera 205 is a dynamic vision sensor (DVS), which provides an event stream of changes in the intensity of light received at pixels of a sensor of the DVS. In this non-limiting example, externally oriented camera 205 generates image data, either as an event stream or as discrete image frames, from which objects in a field of view of HMD 200 may be recognized.

Referring to the non-limiting example of FIG. 2, HMD 200 includes display 207. According to various embodiments, display 207 displays, in an internally facing direction (e.g., in a direction having a component that is opposite to arrow 201) items of AR content in conjunction with views of objects in an externally facing field of view. According to some embodiments, the display 207 is clear (similar to, for example, the displays used in "smart glasses" or "heads-up displays" on the cockpit glass of an airplane) and views of objects in externally facing fields of view come from light passing through display 207. According to various embodiments, (sometimes referred to as "mixed reality") the display 207 is opaque, and views of objects in the externally facing fields of view come from image data from the externally oriented cameras (for example, the externally oriented camera 205).

According to various embodiments, the HMD 200 includes second camera 209. In some embodiments, the second camera 209 is an externally oriented camera of the same type as the externally oriented camera 205, thereby forming a stereoscopic pair that can generate image data comprising depth estimation. In certain embodiments, the second camera 209 is an externally oriented camera having a different sensor type than the externally oriented camera 205. For example, in some embodiments, to extend battery life and minimize processor usage, the externally oriented camera 205 is a DVS sensor, and the second camera 209 is a CMOS type camera, which, while less efficient than a DVS sensor, can provide additional image data that is useful for object recognition. For example, the data can be data regarding colors and elements of a scene whose brightness may not change at a level detectable by a DVS sensor. According to various embodiments, the second camera 209 is an internally facing camera that tracks the motion of the eyes of a user, and by implication, a direction of a gaze of the user. Gaze tracking can be used to support foveal rendering of items of AR content, which can conserve battery and processor resources by rendering items of AR content away from a viewer's gaze at lower resolutions.

According to certain embodiments, the HMD 200 includes processor 211 and memory 213. In certain embodiments, the memory 213 contains program code that, when executed by processor 211, causes the HMD 200 to execute an AR application.

Referring to the non-limiting example of FIG. 2, the HMD 200 includes an inertial measurement unit 215 that generates location data associated with the motion of HMD 200 along one or more degrees of freedom. In certain embodiments, a data output from IMU 215 is usable for positioning (for example, to confirm a geospatial position of HMD 200), or to obtain image stabilization data (for example, data indicating the direction and periodicity of a camera shake) to facilitate object recognition.

In some embodiments, the HMD 200 includes input/output interface 217. According to various embodiments, the I/O interface 217 provides communicative connectivity between the HMD 200 and at least one other electronic device, such as a smartphone, or computer to which the HMD 200 is an accessory device. The I/O interface 217 is, in certain embodiments, a wireless communication interface, such as a BLUETOOTH transceiver, or communication hardware supporting communications over one or more longer range wireless systems (for example, communication unit 110 in FIG. 1).

To solve the technical challenges associated with cameras and other optical sensors which provide image data of an operating environment to support AR applications inherently generating raw data of privacy sensitive information, such as license plates of passing cars or the display of a computer monitor or smartphone in a room, with a desire to avoid permanently capturing and publishing privacy-sensitive information across a network, certain embodiments according the present disclosure implement an intermediary layer at the operating system (OS) level to remove or modify privacy-sensitive information captured during from cameras supporting AR applications. FIGS. 3A and 3B illustrate two, non-limiting examples of architectures according to the present disclosure in which an OS-level intermediary layer is implemented. For convenience of cross-reference, elements common to both of FIGS. 3A and 3B are numbered similarly. The embodiments shown in FIGS. 3A and 3B are for illustration only and other example architectures could be used without departing from the scope of the present disclosure.

In the example depicted FIG. 3A, a first example architecture 300 is shown in the figure. In this explanatory example, an HMD 301 (for example, HMD 200 in FIG. 2) is communicatively connected (for example, via a BLUETOOTH connection, or via a physical cable) to an accessory device 351 (for example, device 100 in FIG. 1) executing an operating system and one or more AR applications 353.

As shown in the example depicted in FIG. 3A HMD 301 includes one or more externally-facing cameras 305, which are trained upon the HMD and collect image data that overlaps with a user's native (i.e., through human eyes) view of a scene. According to various embodiments, the HMD 301 comprises a non-transitory memory and a processor (for example, processor 211 in FIG. 2) capable of executing one or more operating systems suitable for mobile devices, such as ANDROID or iOS. In this example, a first intermediary layer 310 is implemented through the operating system on the HMD, such that first intermediary layer 310 receives image data (for example, raw image data or initially encoded video data, such as video encoded in a standard format, such as MPEG-4) from camera 305, and, as discussed in greater detail herein, performs an initial processing of the data to recognize privacy-sensitive objects within the received image data, and modifies the received image data to obscure regions of the image data containing recognized privacy-sensitive objects. Once modified, the modified image data is passed from HMD 301 to accessory device 351 and provided to AR application 353, as image data of the operating environment of HMD 301. According to certain embodiments, privacy-sensitive image data captured by camera 305 is neither retained at HMD 301 nor passed to accessory device 351. In this way, the need for AR application 353 to obtain scene data useful for recognizing an operating environment at a level appropriate for generating an AR display (for example, information on a user's pose, and information as to the position of objects and the ground plane) can be obtained, while, at the same time, HMD 301 does not perform a dragnet-level sweep of all of the privacy-sensitive information in its operating environment.

FIG. 3B illustrates a second example architecture 350 for implementing an OS-level intermediary layer according to various embodiments of this disclosure. In the illustrative example of FIG. 3B, second intermediary layer 311 is implemented at accessory device 351, rather than HMD 301 (as was the case with first intermediary layer 310). According to certain embodiments, raw image data from camera 305 is passed from HMD 301 to accessory device 351. In this example, accessory device 351 comprises a processor (for example, main processor 140 in FIG. 1) and a memory containing an operating system (for example, OS 161 in FIG. 1). In certain embodiments, second intermediary layer 311 is implemented as part of the operating system or at the kernel layer of accessory device 351. Like first intermediary layer 310 in FIG. 3A, second intermediary layer 311 pre-processes the received image data and modifies regions of the image data containing objects which are recognized as being privacy-sensitive. The modified image data is then passed from second intermediary layer 311 to AR application 353. Provided the link over which raw image data passes from HMD 301 to second intermediary layer 311 is secure, image data of privacy-sensitive objects are neither persistently retained by architecture 350 nor transmitted outside of architecture 350.

FIGS. 3A-3B are for illustration only, and other embodiments, such as embodiments in which the camera, intermediary layer and AR application are implemented on a single platform under the control of a single processor are possible, and within the contemplated scope of this disclosure.

Figure 4:
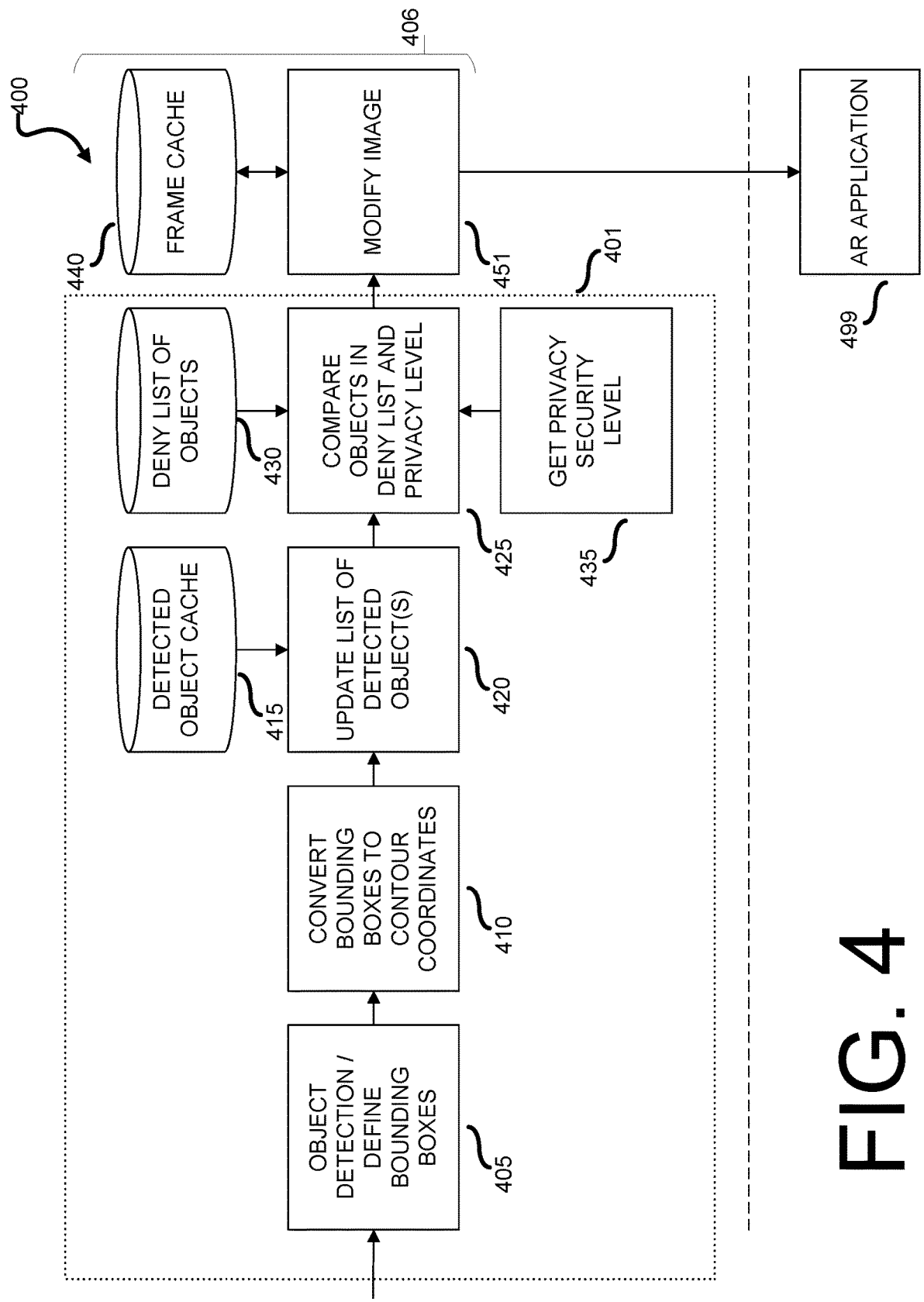
FIG. 4 illustrates, in block diagram format, an example of an intermediary layer, according to various embodiments of this disclosure.

FIG. 4 illustrates, in block diagram format, operative components of an example OS-level intermediary layer 400 according to various embodiments of this disclosure. The embodiments of the OS-level intermediary layer 400 shown in FIG. 4 is for illustration only. Other embodiments could be used without departing from the scope of the present disclosure. As previously discussed with reference to FIGS. 3A and 3B, intermediary layers according to various embodiments of this disclosure (including intermediary layer 400) may be interposed at any point along a data path between a camera (or DVS or other optical sensor) and an AR application, including, without limitation, at an HMD or at an accessory device.

Referring to the example shown in FIG. 4, an intermediary layer 400 includes two main processing stages: a deny list analysis stage 401; and an image data modification stage 451. According to certain embodiments, a deny list analysis stage 401 receives raw image data from a camera, identifies objects within the data, assigns coordinate regions (for example, bounding boxes) corresponding to the identified objects, and manages whether the image data in the assigned coordinate regions is to be modified or obscured before passing the image data to one or more AR applications 499 operating outside of intermediary layer 400. Image data modification stage 451 modifies raw image data received from the camera in the coordinate regions specified by the analysis implemented by deny list analysis stage 401, and passes the modified data to the one or more AR applications 499.

As shown in FIG. 4, image data (for example, raw image data or image data encoded to a format compatible with AR application 499) is received at intermediary layer 400 by object detection stage 405. According to various embodiments, object detection stage 405 performs real-time object detection of predefined objects (for example, people, screens, vehicles, text) within the received image data, and defines bounding boxes containing the detected objects. As used in this disclosure, the expression "bounding box" encompasses a set of vectors or connected line segments that define a closed region containing an identified object. In some embodiments, object detection stage 405 comprises a convolutional neural network (CNN) which is trained to extract features associated with the predefined objects from the received image data. In various embodiments, the CNN is connected to a fully connected output layer which outputs predictions of objects in the image layer based on the detected features. According to some embodiments, the CNN component of object detection stage 405 is further connected to a pooling layer which generates bounding boxes defining regions within the image data which contain the detected objects. In certain embodiments, object detection stage 405 may be implemented as program code which is executed by the processor of the platform providing intermediary layer 400. In some embodiments, to enhance performance, object detection stage 405 is implemented through purpose-specific hardware, such as a system on a chip (SoC) comprising a neural processing unit (NPU). Examples of SoC which can operate as object detection stage 405 include, without limitation the EXYNOS 2100 series processor by SAMSUNG.

Referring to the illustrative example of FIG. 4, at block 410, contour coordinates for objects within the bounding boxes defined at object detection stage 405 are determined. In certain embodiments, the contour coordinates are determined using a square tracing algorithm. According to certain embodiments, by determining the contour coordinates of recognized objects, more granular modification of the image data (i.e., image data in which non-privacy sensitive objects are not inadvertently removed from the data) can be performed.

As shown in FIG. 4, at object cache 415, the contour coordinates and one or more identifiers of detected objects are temporarily stored in a cache maintained by intermediary layer 400, to facilitate downstream operations of intermediary layer 400. Examples of downstream operations include, without limitation, drawing virtual bounding boxes in a user interface (UI) presented at the HMD, so that a user can select objects to be added to a user-defined deny list. According to various embodiments, the data cached at object cache 415 includes, without limitation, a name or type identifier of a detected object, identifiers of privacy filters (for example, a user-selected filter specifying modification of the image data) and contour coordinates of the object. According to various embodiments, the detected object cache to which detect object data is stored is periodically flushed, to reduce any probability of privacy-sensitive information passing outside of intermediary layer 400.

Referring to the illustrative example of FIG. 4, at block 420, a list of objects in the operating environment of the HMD which have been detected within a threshold period of time is generated or updated to reflect the addition of objects added to the detected object cache 415. According to some embodiments, the items in the detected object list are time stamped, and updating the list at block 420 comprises deleting objects from the list and detected object cache with out-of-range time stamps, thereby helping ensure the recency and accuracy of the items of the detected object list.

In certain embodiments, the current list of detected objects is passed to block 425, for a comparison against a deny list 430 of objects and a mapping of privacy levels to objects 435. According to various embodiments, deny list 430 comprises two lists, a fixed list of objects subject to privacy level modifications (i.e., objects that inherently, either due to their nature, or through established privacy standards, such as GDPR, are privacy-sensitive objects, such as credit cards, bank checks, passports or drivers' licenses) and a user-defined list of objects subject to privacy-level modifications. As shown in the FIG. 4, a Boolean comparison between the items of deny list 430 against the updated list of detected objects. For objects in the updated detected object lists matching items in deny list 430, a privacy level associated with the object is obtained at block 435. According to various embodiments, privacy levels for objects in a denied list may fall into two categories: (1) immutable privacy levels; and (2) user-configurable privacy levels. Immutable privacy levels mandate restrictions on the display and capture of image data of certain privacy-sensitive objects (for example, particularly privacy sensitive objects which are not reasonably necessary for providing an AR display). User-configurable privacy levels may be applied for other detected objects on deny list 430. In some embodiments, the privacy levels obtained at block 435 may specify contexts in which image data containing objects in deny list 430 is to be modified before being passed to AR application 499.

At block 451, the image data provided to intermediary layer 451 is modified such that image data of detected objects on the deny list which satisfy a privacy level condition is modified, such that image data of privacy sensitive objects does not pass beyond intermediary layer 499. In some embodiments, modification of the image comprises converting all of the pixels bounded within the contour coordinates determined at block 410 to a single color, such as black. In certain embodiments, an image completion method (i.e., a context-aware fill) is used to replace the pixels bounded within the contour coordinates in a way that makes it more difficult for outside applications to predict what objects may have been removed from the image data.

At block 440, a frame comprising the unmodified image data containing the detected objects satisfying the privacy level condition is cached in a frame cache 440. According to some embodiments, a frame comprising the modified image data is also cached in frame cache 440. In this way, the process of modifying image data for privacy-sensitive objects may be accelerated and made less computationally expensive by performing comparisons of cached image data against newly-received image data and, where a high degree of pixel-level similarity between the new and cached image data is present, some or all of the cached modifications may be reused.

Finally, the modified image data is passed to one or more AR applications 499 executing outside of intermediary layer 400. According to certain embodiments, such as embodiments utilizing the ANDROID operating system, modified image data is passed to a compositor frame cache of OS-provided graphics pipeline.

FIG. 5 illustrates an example architecture 500 for implementing user control over a deny list (for example, a user-defined list maintained as part of deny list 430 in FIG. 4) according to various embodiments of this disclosure. The embodiment of the architecture 500 shown in FIG. 5 is for illustration only. Other embodiments could be used without departing from the scope of the present disclosure. For convenience of cross-reference, elements shown in FIG. 5 which are common to other figures are numbered similarly.

In addition to a list of objects that are inherently, or necessarily privacy-sensitive, deny lists (for example, deny list 430 in FIG. 4) according to some embodiments of this disclosure may also include a user-defined/user-managed list of privacy objects, which can be configured through the HMD providing the AR display.

Referring to the non-limiting example of FIG. 5, architecture 500 comprises an HMD 301, which is configured to provide an AR display comprising objects in an operating environment of the HMD 301 within a field of view of an externally facing camera. In some embodiments, HMD 301 is configured to provide a user interface, through which a wearer of HMD can select objects or regions within an AR display. In some embodiments, HMD 301 has one or more internally-facing cameras or other optical sensors to support gaze tracking, and the user can manipulate the UI, at least in part, through her gaze (for example, by looking at an object or region of the AR display for a threshold period of time). Alternatively, or additionally, HMD 301 may be communicatively connected to one or more accessory devices through which a user may interact with the HMD UI.

As shown in FIG. 5, architecture 500 allows users to configure at least the following user-defined parameters: 1.) selection and removal of recognized objects from a user-defined deny list (for example, deny list 430 in FIG. 4); and 2.) adjustment of privacy level parameters (for example, additional geographic, time or other gating factors affecting when image data of objects on a deny list is modified).

According to various embodiments, the UI provided through HMD 301 includes an icon or selection region from which a user can pull up an interface for toggling the privacy level associated with a detected object within the AR display. For example, the UI may comprise a highlighting box identifying the detected object for which the user can toggle the privacy level, and a menu or list of selectable privacy levels. Examples of selectable privacy levels include, without limitation, denying all applications from accessing all image data of the operating environment (a setting appropriate for certain locations, such as government buildings or banks), filtering all objects on a deny list, allowing AR applications to access all image data, and conditionally allowing objects to be displayed (for example, a geofencing constraint which selectively allows or disallows objects to be shown depending on the location). At block 505, a user may interact with one or more privacy settings, which are then passed to deny list analysis stage 401 and one or more privacy settings (for example, the privacy settings obtained at block 435 in FIG. 4) are updated in response to the most recent user selection.

Alternatively or additionally, architecture 500 provides an HMD-based UI through which users can select or remove recognized objects from a deny list maintained at the intermediary layer. According to various embodiments, at block 510, a user can select an object (for example, by maintaining her gaze upon an identifier of the object, such as a bounding box) for a threshold period of time. Once an object has been selected, the UI may receive a further input to toggle the object on or off of a deny list. As shown in FIG. 5, at block 515, the user's selection at block 510 is passed to the deny list analysis stage 401.

According to various embodiments, architecture 500 provides a visual mechanism for showing whether an object is presently on or off of a deny list. Referring to the illustrative example of FIG. 5, before passing the image information to the image modification stage (for example, image modification 451 in FIG. 4), deny list stage 401 outputs coded bounding boxes to be presented as part of the UI to show the current display/do not display status of recognized objects within the image data. According to some embodiments, at block 520, recognized objects that are currently on the deny list maintained at the intermediary layer are shown in the UI with red bounding boxes. At block 525, green bounding boxes are applied to recognized objects not currently on any deny list. After a predetermined interval without a user input or in response to a further user input, the updates to the privacy settings and deny lists indicated by the bounding boxes generated at blocks 525 and 530 are accepted as the new settings for deny list analysis stage 401.

FIG. 6 illustrates operations of an example architecture 500 for reducing the computational load associated with implementing an intermediary layer to control the passage of image data of privacy-sensitive objects. For example, while the computational tasks associated with blocks 405-451 of FIG. 4 can be performed as described for every frame of image data received by intermediary layer 400, doing so may often be unnecessary and computationally wasteful. This is because the frame rates of presently-available cameras (between approximately 30 to 950 frames per second) suitable for use in an HMD typically vastly exceeds the rate at which a user's view of an operating environment changes. Barring rapid changes in a user's perspective or the presence of fast-moving visible objects (for example, golf balls or race cars), the appearance of most real-world scenes does not change appreciably over intervals of $\frac{1}{30}^{th}$ of a second or less.

Certain embodiments according to the present disclosure leverage the fact that, much of the time, a user's view the operating environment of an HMD changes at a significantly slower rate than the frame rate of the camera obtaining scene information for an AR display provided through the HMD, and avoid the operations of detecting, identifying and determining contour coordinates anew for each frame received at an intermediary layer.

FIG. 6 illustrates a process for repurposing cached object detection and data modification, according to certain embodiments of this disclosure. While FIG. 6 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 600 depicted can be implemented by one or more processors in an electronic device, such as by one or more processors 140 of device 100.

According to various embodiments, when new image data is received from a camera, one or more operations of method 600 may be performed on the data to determine whether the operations performed at blocks 405-435 of FIG. 4 may be avoided, at least in part.

Referring to the non-limiting example of FIG. 6, at operation 605, when a frame of new image data is received from the camera at the intermediary layer, a perceptual hash of the new image data is calculated. Additionally, either at operation 605 or previously, the second-most recent frame of image data is retrieved from frame cache 440, and a perceptual hash of the second-most recent frame of image data is calculated. According to various embodiments, suitable perceptual hashing algorithms include algorithms of the pHash open-source library. Further, at operation 605, a comparison between the perceptual hash of the most recent frame of image data relative to the perceptual hash of the second-most recent frame of image data to obtain a value quantifying the pixel-level similarity between the two frames of image data. Where the similarity value between the hash of the most recent frame of image data and the second-most recent frame of image data meets or exceeds a predetermined threshold value, method 600 continues to operations 610-630. Where the similarity between frames falls short of the predetermined threshold, method 600 ends, and the image data is passed to a deny list analysis stage (for example, deny list analysis stage 401 in FIG. 4).

As shown in the example depicted in FIG. 6, at operation 610, bounding box coordinates for detected objects in the second most recent frame of image data are retrieved from a cache (for example, detected object ache 415 in FIG. 4) maintained in the intermediary layer. As discussed elsewhere, the operations of method 600 can reduce the computational load associated with identifying privacy-sensitive objects in a scene, determining whether image data associated with privacy-sensitive objects requires modification according to a privacy policy and determining coordinate regions for modifying the image data. According to certain embodiments, operation 605 can significantly reduce the computational load associated with identifying privacy-sensitive objects in a subsequently and determining whether image data of the privacy-sensitive objects requires modification. This is because, apart from fringe cases, if a comparison between a perceptual hash of the most recently obtained scene data and second most-recently obtained data shows a similarity above a threshold value, this is reliable evidence that the objects in the image data are the same between the two frames.

According to certain embodiments, at operation 615, the cached bounding box or contour coordinates are not recalculated anew (for example, as described with reference to block 410 in FIG. 4), but rather, adjusted to compensate for the quantifiably minor differences between the most recent frame of image data and the second-most recent frame of image data taken from cache. According to various embodiments, bounding box and/or contour coordinates may be updated at operation 615 using optic flow and/or camera shift techniques to adjust the locations of bounding boxes and/or contour coordinates based on the overall trends in the observed and predicted motion of objects within the image data.

Referring to the illustrative example of FIG. 6, in certain embodiments (for example, in embodiments providing user-defined privacy settings), the HMD presenting the AR display presents bounding boxes showing the detected objects in the operating environment, and indicators of their privacy settings. According to various embodiments, the image data associated with bounding boxes to be presented as part of an AR display are updated at operation 620.

In certain embodiments, at operation 625, a frame of an AR display, including the updated bounding boxes, and, in some cases, one or more AR objects positioned in the display to appear as real-world objects is rendered. According to various embodiments, at operation 630, the updated bounding box coordinates are stored in a cache maintained by the intermediary layer (for example, frame cache 440 or detected object cache 415 in FIG. 4).

Figure 7A:
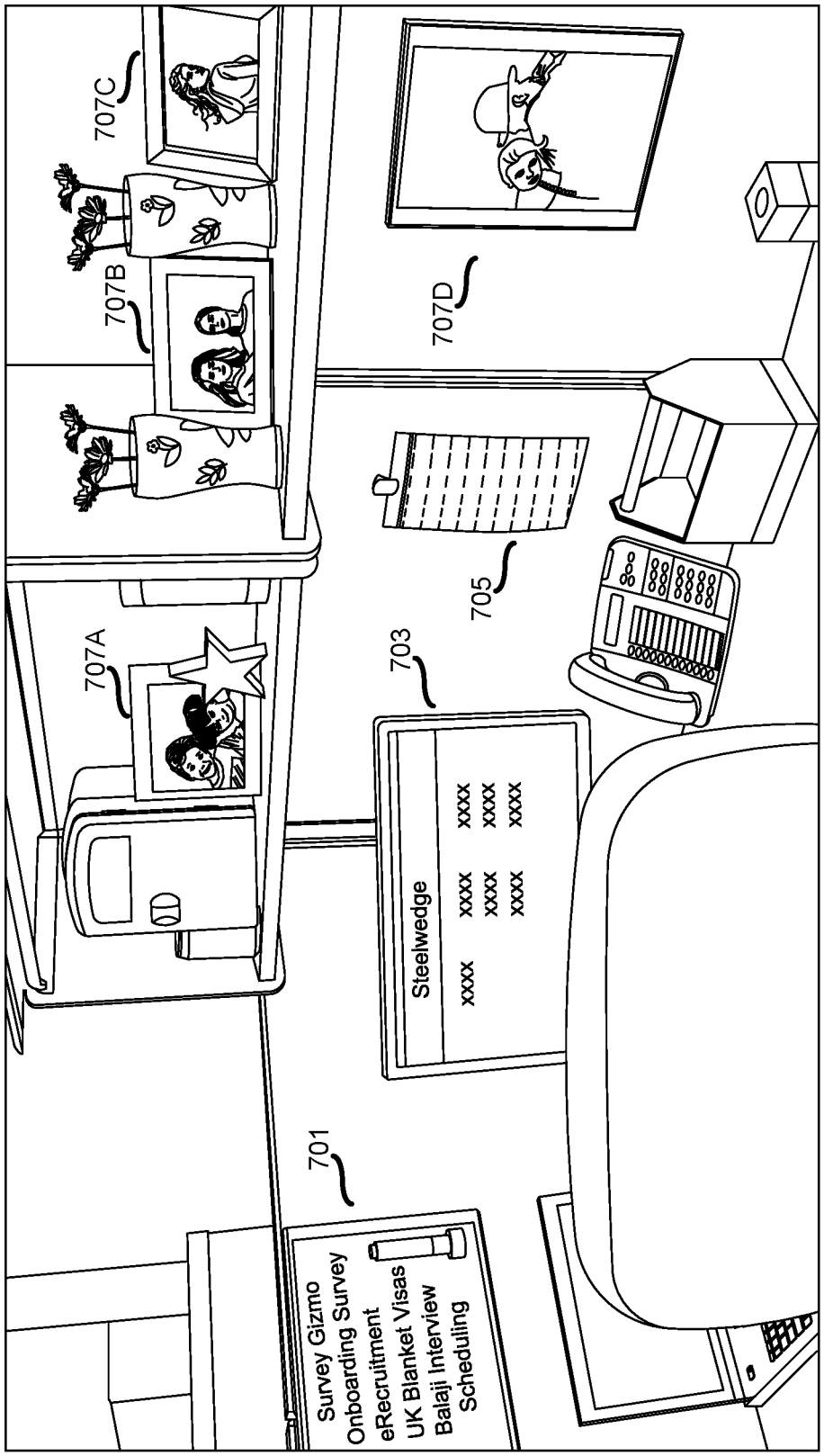
FIGS. 7A-7C illustrate examples of image data, a UI and modification of image data according to various embodiments of this disclosure.
Figure 7B:
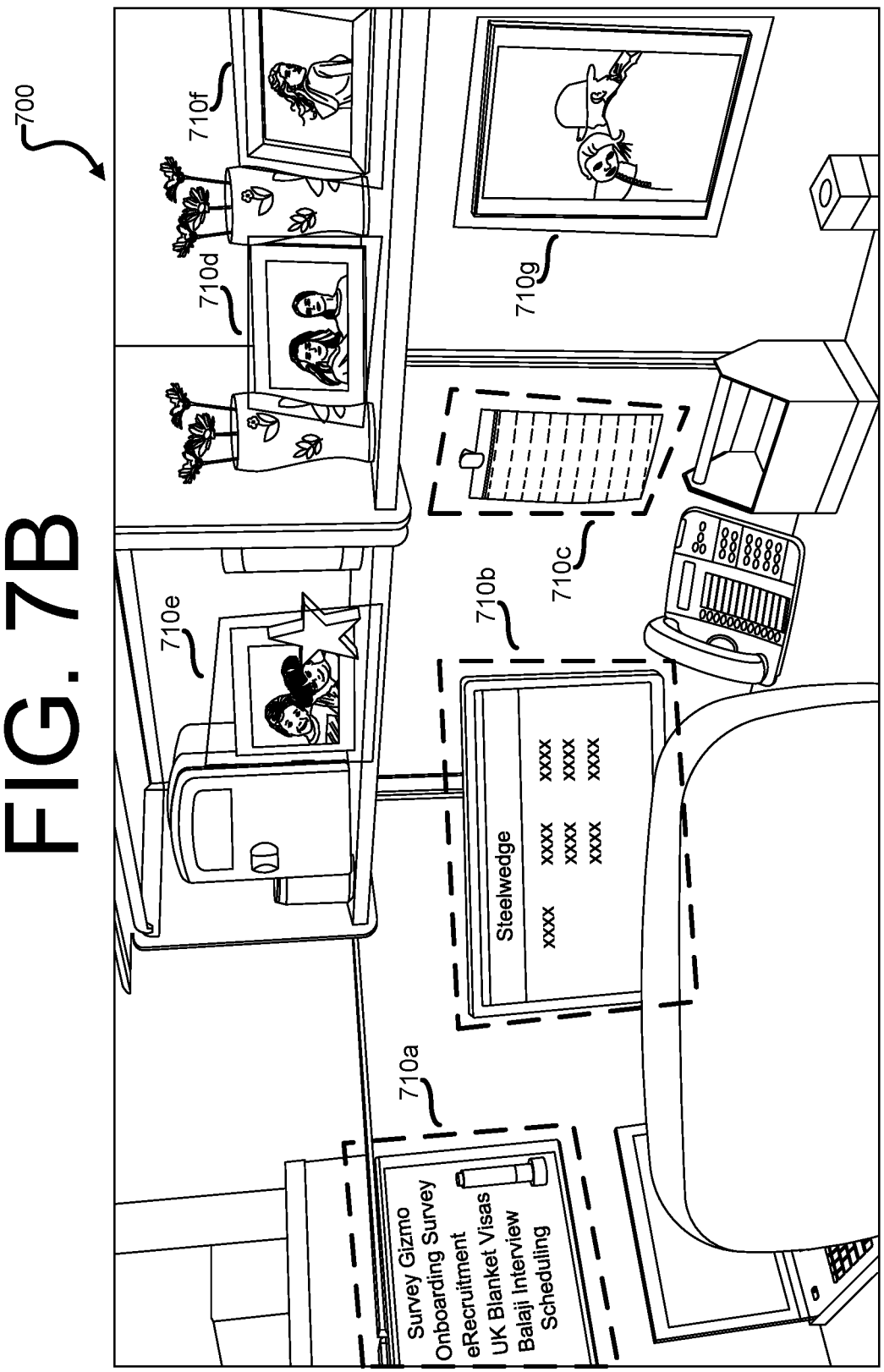
Figure 7C:
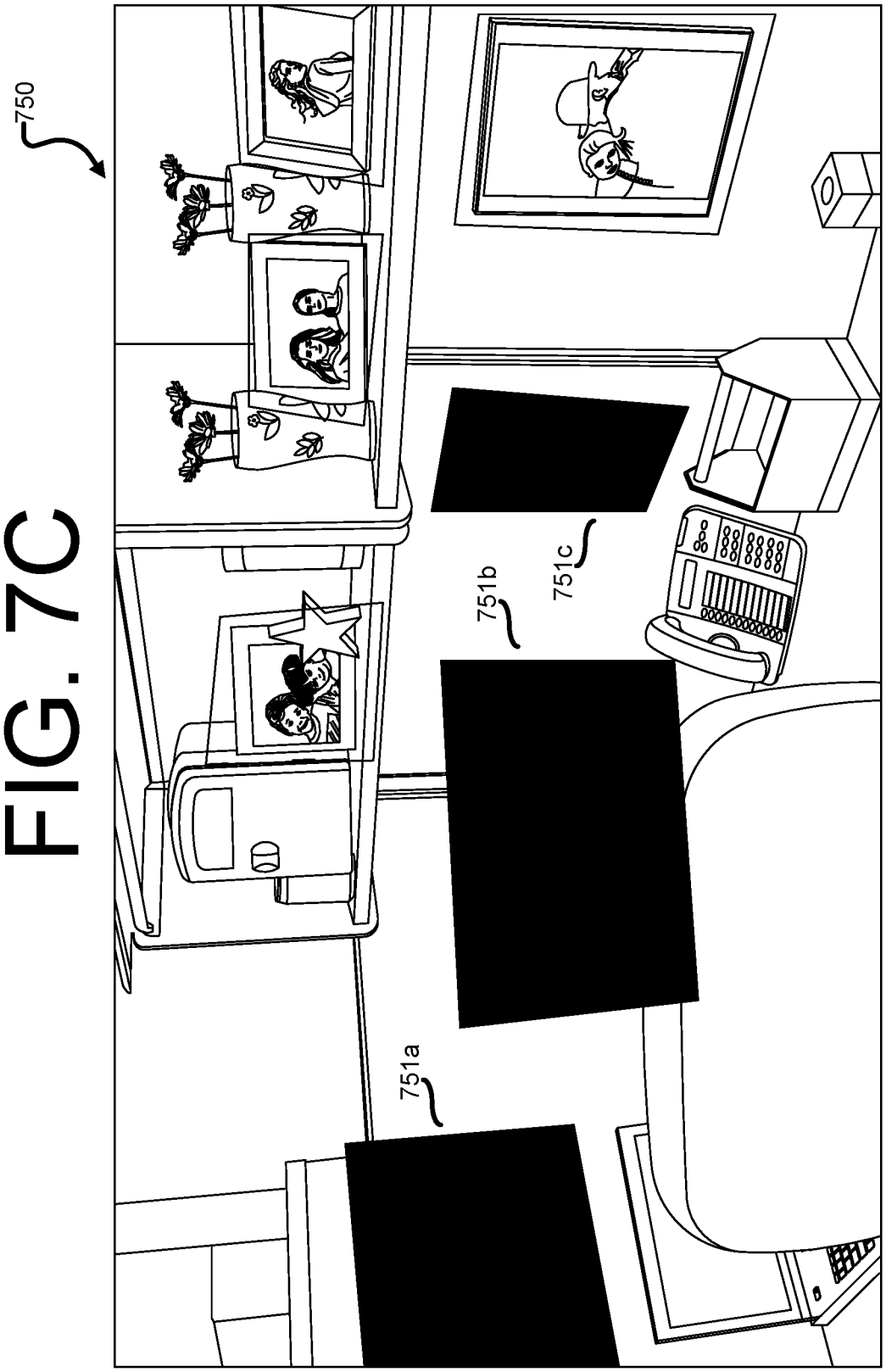

FIGS. 7A-7C illustrate examples of modifying image data and presenting user interfaces for managing privacy levels of detected objects according to various embodiments of this disclosure. The examples shown in FIGS. 7A-7C are for illustration only. Other examples could be used without departing from the scope of the present disclosure. For convenience of cross-reference, items common to more than one of FIGS. 7A-7xx are numbered similarly.

In example shown in FIG. 7A, depicted is a representation of a frame 700 of image data of a scene obtained by a camera (for example, camera 305 in FIG. 3A) as received at an intermediary layer (for example, at object detection stage 405 in FIG. 4). Frame 700 includes image data of a real-world operating environment which comprises an office cubicle. The potentially privacy sensitive objects in frame 700 include whiteboard 701, which has a list of action items for the occupant of the office cubicle. The potentially privacy sensitive objects in frame 700 further comprise desktop monitor 703, desk calendar 705, and photographs 707a-707d. Depending on the context and privacy policies in place, image data of some or all of objects 701-701d may be subject to restrictions on capture and distribution.

FIG. 7B illustrates an example of an AR UI by which a user can update a deny list of identified objects within 700 and configure privacy levels for identified objects according to various embodiments of this disclosure. In the example shown in FIG. 7B, a frame 700 or a cached frame satisfying a similarity threshold (for example, a comparison of perceptual hashes) has been passed through at least part of a deny list analysis stage of an intermediary layer (for example, intermediary layer 400 in FIG. 4). As a result of performing the deny list analysis, an AR UI 730 is presented through the HMD, wherein AR UI 730 comprises bounding boxes 710a-710g for each of the recognized privacy-sensitive objects in frame 700. According to various embodiments, bounding boxes 710a-710g may be displayed in AR UI 730 in a way that indicates their status on one or more of a deny list or a privacy policy. For example, bounding boxes 710a-710c, which are drawn around the whiteboard, computer monitor and calendar in frame 700 are shown in AR UI 730 with dotted line bounding boxes, while bounding boxes 710d-710g surrounding the pictures on a cubicle's shelves and partitions have solid lines. According to certain embodiments, the dotted line bounding boxes may be a visual indicator provided by AR UI 730 that the objects within the bounding boxes are on a deny list and contain image data that is to be modified according to a privacy policy, while the solid line bounding boxes are a visual indicator that the bounded objects are either not on a deny list or do not contain image data to be modified according to a privacy policy. In some embodiments, a user can select one of bounding boxes 710a-710g through AR UI 730 (for example, by utilizing gaze tracking provided by the HMD and fixing her gaze at a specific bounding box) and modify either a deny list or privacy setting associated with the image data identified with the bounding box (for example, as described with reference to FIG. 5 of this disclosure).

FIG. 7C provides a visualization of an example of a modified frame of image data 750 as passed from the intermediary layer to an AR application executing outside of the intermediary layer, according to various embodiments of this disclosure. The modified frame of image data 750 includes a subset of the source image data of FIG. 7A, wherein image data of certain privacy sensitive objects is modified, obscured, or otherwise prevented from passing beyond the intermediary layer to processes operating within a "normal" operating system world executing on the device. The image data of the whiteboard, the computer monitor, and the calendar is replaced with blank regions 751a-751c. According to certain embodiments, the contours of blank regions 751a-751c may be softened or expanded to avoid closely following the silhouettes of the privacy-sensitive objects. In this way, the likelihood of the privacy-sensitive objects' identities being inferred from regions of modified data is reduced. In certain embodiments, modified frame of image data 750 is then passed from the intermediary layer to one or more AR applications operating within an OS framework.

FIG. 8 illustrates a process for implementing an intermediary layer (for example, intermediary layer 310 in FIG. 3A) for managing image data of privacy-sensitive objects in an AR system according to various embodiments of this disclosure. While FIG. 8 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted can be implemented by a processor provided on one or more computing platforms used to provide an AR display, such as at an HMD or at an accessory device communicatively connected to an HMD.

Referring to the non-limiting example of FIG. 8, at operation 805, an intermediary layer receives image data of a real-world operating environment, wherein the image data is captured by a camera supporting an HMD (for example, camera 205 in FIG. 2) at a first time. Depending on embodiments, the image data received at the camera may be raw sensor data (for example, a .RAW file, or a feed of sensor events from a dynamic vision sensor obtained over a specified time interval). In some embodiments, the intermediary layer receives image data which has been encoded into a format preferred by the AR application.

According to various embodiments, at operation 810, one or more processes or modules implemented in the intermediary layer (for example, object detection stage 405 in FIG. 4) processes the received image data, and recognizes one or more objects in the received image data. According to various embodiments, operation 810 may be performed in whole, or in part, by dedicated hardware, such as an NPU or object recognition processor.

As shown in FIG. 8, at operation 815, one or more processes or modules implemented at the intermediary layer (for example, block 410 in FIG. 4, determines contour coordinates of a region comprising the image data of the privacy-sensitive object. According to various embodiments, as part of operation 815, the determined contour coordinates are stored locally in a cache maintained by the intermediary layer and inaccessible to the one or more AR applications executing on the computing platform performing method 800.

At operation 820, a display permission for one or more of the identified objects in the obtained image data is determined. According to some embodiments, determining the display permission (for example, as described with reference to blocks 425 and 435 of FIG. 4) comprises a two part determination of whether the detected object is on a deny list, and a second determination of a privacy policy/display rule applicable to objects on the deny list.

According to various embodiments, at operation 825, where the display permission associated with one or more detected objects in the image data specifies not passing the image data beyond the intermediary layer, a pixel level modification of image data comprising, at a minimum, pixels within the determined contour coordinates is performed. According to some embodiments, the modification of the data comprises replacing the pixels within the contour coordinates with a field of a chosen color. In certain embodiments, to reduce the likelihood of the privacy-sensitive object being inferred from the shape of the modified image data, pixels beyond those within the contour coordinates may be modified, or a more computationally-intensive modification technique (for example, guided blending) may be performed to diminish the likelihood of privacy-sensitive information being recovered.

At operation 830, the modified image data is passed to one or more AR applications executing outside of the intermediary layer. In certain embodiments, the modified image data may also be cached locally within the intermediary layer (for example, in frame cache 440 in FIG. 4).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method, comprising:
receiving, at an intermediary layer from a camera of a head mounted display (HMD), image data of a real-world operating environment of the HMD at a first time;
identifying, at the intermediary layer, one or more real-world objects in the image data of the real-world operating environment;
determining, at the intermediary layer, coordinates of a region of the image data comprising the one or more identified real-world objects;
determining a display permission for the one or more identified real-world objects;
modifying the image data in the region of the image data comprising the one or more identified real-world objects according to the display permission; and
outputting the modified image data to an application executing outside of the intermediary layer to be displayed according to the display permission.

2. The method of claim 1, wherein the application executing outside of the intermediary layer is configured to only obtain image data of the real-world operating environment from the camera of the HMD via the intermediary layer.

3. The method of claim 1, further comprising:
receiving, at the intermediary layer, context information of the real-world operating environment;
wherein the display permission for the one or more identified real-world objects is based at least in part on the context information.

4. The method of claim 3, wherein the context information comprises one or more of: a location coordinate of the HMD, a combination of identified real-world objects in the image data, a network connection, or a received privacy signal.

5. The method of claim 1, wherein determining the display permission for the one or more identified real-world objects comprises:
searching for the one or more identified real-world objects on a deny list; and
responsive to finding the one or more identified real-world objects on the deny list, obtaining the display permission associated with the one or more identified real-world objects.

6. The method of claim 1, further comprising:
caching the modified image data of the real-world operating environment in a frame cache maintained at the intermediary layer;
receiving, at the intermediary layer from the camera, image data of the real-world operating environment of the HMD at a second time subsequent to the first time;
determining a similarity between the modified image data of the real-world operating environment in the frame cache and the image data of the real-world operating environment from the second time;
responsive to the modified image data of the real-world operating environment in the frame cache and the image data of the real-world operating environment from the second time satisfying a similarity threshold, modifying the image data of the real-world operating environment from the second time in the region comprising the one or more identified real-world objects according to the display permission; and
outputting the modified image data of the real-world operating environment from the second time to the application executing outside of the intermediary layer to be displayed according to the display permission.

7. The method of claim 6, further comprising:
determining a change in camera perspective between the first time and the second time;
updating the coordinates of the region comprising the one or more identified real-world objects based on the change in camera perspective; and
storing the updated coordinates of the region comprising the one or more identified real-world objects in the frame cache.

8. An apparatus comprising:
at least one processor; and
at least one memory containing instructions that, when executed by the at least one processor, cause the apparatus to:
receive, at an intermediary layer from a camera of a head mounted display (HMD), image data of a real-world operating environment of the HMD at a first time,
identify, at the intermediary layer, one or more real-world objects in the image data of the real-world operating environment,
determine, at the intermediary layer, coordinates of a region of the image data comprising the one or more identified real-world objects,
determine a display permission for the one or more identified real-world objects,
modify the image data in the region of the image data comprising the one or more identified real-world objects according to the display permission, and
output the modified image data to an application executing outside of the intermediary layer to be displayed according to the display permission.

9. The apparatus of claim 8, wherein the application executing outside of the intermediary layer is configured to only obtain image data of the real-world operating environment from the camera of the HMD via the intermediary layer.

10. The apparatus of claim 8, wherein:
the at least one memory further contains instructions that, when executed by the at least one processor, cause the apparatus to receive, at the intermediary layer, context information of the real-world operating environment, and
the display permission for the one or more identified real-world objects is based at least in part on the context information.

11. The apparatus of claim 10, wherein the context information comprises one or more of: a location coordinate of the HMD, a combination of identified real-world objects in the image data, a network connection, or a received privacy signal.

12. The apparatus of claim 8, wherein the instructions that when executed cause the apparatus to determine the display permission for the one or more identified real-world objects comprise instructions that when executed cause the apparatus to:
search for the one or more identified real-world objects on a deny list, and
responsive to finding the one or more identified real-world objects on the deny list, obtain the display permission associated with the one or more identified real-world objects.

13. The apparatus of claim 8, wherein the at least one memory further contains instructions that, when executed by the at least one processor, cause the apparatus to:

cache the modified image data of the real-world operating environment in a frame cache maintained at the intermediary layer, receive, at the intermediary layer from the camera, image data of the real-world operating environment of the HMD at a second time subsequent to the first time, determine a similarity between the modified image data of the real-world operating environment in the frame cache and the image data of the real-world operating environment from the second time, responsive to the modified image data of the real-world operating environment in the frame cache and the image data of the real-world operating environment from the second time satisfying a similarity threshold, modify the image data of the real-world operating environment from the second time in the region comprising the one or more identified real-world objects according to the display permission, and output the modified image data of the real-world operating environment from the second time to the application executing outside of the intermediary layer to be displayed according to the display permission.

14. The apparatus of claim 13, wherein the at least one memory further contains instructions that, when executed by the at least one processor, cause the apparatus to:

determine a change in camera perspective between the first time and the second time, update the coordinates of the region comprising the one or more identified real-world objects based on the change in camera perspective, and store the updated coordinates of the region comprising the one or more identified real-world objects in the frame cache.

15. A non-transitory, computer-readable medium containing instructions that, when executed by at least one processor, cause an apparatus to:

receive, at an intermediary layer from a camera of a head mounted display (HMD), image data of a real-world operating environment of the HMD at a first time, identify, at the intermediary layer, one or more real-world objects in the image data of the real-world operating environment, determine, at the intermediary layer, coordinates of a region of the image data comprising the one or more identified real-world objects, determine a display permission for the one or more identified real-world objects, modify the image data in the region of the image data comprising the one or more identified real-world objects according to the display permission, and output the modified image data to an application executing outside of the intermediary layer to be displayed according to the display permission.

16. The non-transitory, computer-readable medium of claim 15, wherein the application executing outside of the intermediary layer is configured to only obtain image data of the real-world operating environment from the camera of the HMD via the intermediary layer.

17. The non-transitory, computer-readable medium of claim 15, further comprising instructions that, when executed by the at least one processor, cause the apparatus to receive, at the intermediary layer, context information of the real-world operating environment, wherein the display permission for the one or more identified real-world objects is based at least in part on the context information.

18. The non-transitory, computer-readable medium of claim 17, wherein the context information comprises one or more of; a location coordinate of the HMD, a combination of identified real-world objects in the image data, a network connection, or a received privacy signal.

19. The non-transitory, computer-readable medium of claim 15, wherein the instructions that when executed cause the apparatus to determine the display permission for the one or more real-world objects comprise instructions that when executed cause the apparatus to:

search for the one or more identified real-world objects on a deny list, and responsive to finding the one or more identified real-world objects on the deny list, obtain the display permission associated with the one or more identified real-world objects.

20. The non-transitory, computer-readable medium of claim 15, further comprising instructions that, when executed by the at least one processor, cause the apparatus to:

cache the modified image data of the real-world operating environment in a frame cache maintained at the intermediary layer, receive, at the intermediary layer from the camera, image data of the real-world operating environment of the HMD at a second time subsequent to the first time, determine a similarity between the modified image data of the real-world operating environment in the frame cache and the image data of the real-world operating environment from the second time, responsive to the modified image data of the real-world operating environment in the frame cache and the image data of the real-world operating environment from the second time satisfying a similarity threshold, modify the image data of the real-world operating environment from the second time in the region comprising the one or more identified real-world objects according to the display permission, and output the modified image data of the real-world operating environment from the second time to the application executing outside of the intermediary layer to be displayed according to the display permission.

* * * * *